US010596888B2

(12) United States Patent
Eastwood et al.

(10) Patent No.: US 10,596,888 B2
(45) Date of Patent: Mar. 24, 2020

(54) VENT WITH INTEGRATED DETENT

(71) Applicant: Sportech, Inc., Elk River, MN (US)

(72) Inventors: Matt Eastwood, Milaca, MN (US); Cory McWhorter, Big Lake, MN (US)

(73) Assignee: Sportech, LLC, Elk River, MN (US)

( * ) Notice: Subject to any disclaimer, the term of this patent is extended or adjusted under 35 U.S.C. 154(b) by 264 days.

(21) Appl. No.: 15/899,011

(22) Filed: Feb. 19, 2018

(65) Prior Publication Data

US 2018/0236856 A1    Aug. 23, 2018

Related U.S. Application Data

(60) Provisional application No. 62/461,376, filed on Feb. 21, 2017.

(51) Int. Cl.
*B60J 7/16* (2006.01)
*B60H 1/26* (2006.01)
*B60H 1/34* (2006.01)

(52) U.S. Cl.
CPC ............ *B60J 7/1642* (2013.01); *B60H 1/262* (2013.01); *B60H 1/3421* (2013.01); *B60H 2001/3464* (2013.01); *E05Y 2900/542* (2013.01)

(58) Field of Classification Search
CPC ...... B60J 7/1642; B60H 1/262; B60H 1/3421; B60H 2001/3464; E05Y 2900/542
USPC ......................................................... 454/136
See application file for complete search history.

(56) References Cited

U.S. PATENT DOCUMENTS

| | | | |
|---|---|---|---|
| 3,195,439 A | 7/1965 | Stratton | |
| 3,846,938 A | 11/1974 | Kelly | |
| 3,974,753 A | 8/1976 | Blomgren et al. | |
| 4,033,621 A | 7/1977 | Rogers | |
| 4,068,408 A | 1/1978 | Hauber | |
| 4,101,159 A | 7/1978 | Stewart | |
| 4,120,524 A | 10/1978 | Buck, Jr. | |
| 4,205,875 A | 6/1980 | Smith | |
| 4,257,632 A | 3/1981 | DeStepheno | |
| 4,275,920 A | 6/1981 | Pohl | |
| 4,279,441 A | 7/1981 | Prechter et al. | |
| RE30,969 E | 6/1982 | Buck, Jr. | |
| 4,371,204 A | 2/1983 | George et al. | |
| 4,546,693 A | 10/1985 | McTaw, Jr. | |
| 4,968,088 A | 11/1990 | Schurmann | |
| 5,026,113 A | 6/1991 | DiCarlo et al. | |
| 5,374,215 A | 12/1994 | Crider et al. | |
| 5,672,101 A | 9/1997 | Thomas | |
| 5,766,068 A * | 6/1998 | Kelly ................. | B60H 1/26 454/145 |
| 6,045,176 A | 4/2000 | Shoup | |
| 6,073,995 A | 6/2000 | Klein | |
| 6,280,315 B1 * | 8/2001 | Kelly ................. | B60H 1/265 454/145 |
| 6,468,147 B1 | 10/2002 | Thomas | |
| 7,004,832 B2 | 2/2006 | Thomas | |
| 7,470,179 B1 | 12/2008 | Ritter et al. | |
| 7,731,249 B2 | 6/2010 | Milks | |
| 7,731,574 B2 | 6/2010 | Milks | |

(Continued)

*Primary Examiner* — Gregory L Huson
*Assistant Examiner* — Dana K Tighe
(74) *Attorney, Agent, or Firm* — Greenberg Traurig, LLP; Dipak J. Shah

(57) ABSTRACT

An operable vent for mounting on a substantially planar structure and configured for adjusting an opening in the planar structure to control air flow through the opening.

25 Claims, 12 Drawing Sheets

(56) References Cited

U.S. PATENT DOCUMENTS

| | | | |
|---|---|---|---|
| 8,029,052 B2 | 10/2011 | Kadzban et al. | |
| 8,727,841 B2 * | 5/2014 | Lugas | B60H 1/262 |
| | | | 454/145 |
| 8,947,603 B2 | 2/2015 | Werth et al. | |
| 9,290,080 B1 * | 3/2016 | Kelly | B60H 1/262 |
| 9,358,858 B2 | 6/2016 | Song | |
| D762,528 S | 8/2016 | Allard et al. | |
| 9,499,029 B2 | 11/2016 | Gaudet et al. | |
| 2005/0103400 A1 | 5/2005 | Eichelberger et al. | |
| 2006/0111034 A1 | 5/2006 | Parry | |
| 2008/0139101 A1 | 6/2008 | Bickel et al. | |
| 2009/0162188 A1 | 6/2009 | Milks | |
| 2015/0328964 A1 | 11/2015 | Gaudet et al. | |

* cited by examiner

VENT WITH INTEGRATED DETENT

CROSS-REFERENCE TO RELATED APPLICATIONS

This application claims the benefit of U.S. Provisional Patent Application No. 62/461,376 filed Feb. 21, 2017, which is herein incorporated by reference in its entirety.

STATEMENT REGARDING FEDERALLY SPONSORED RESEARCH OR DEVELOPMENT

Not applicable.

TECHNICAL FIELD

The instant disclosure pertains to an operable and adjustable vent configured for mounting on a substantially planar structure.

BACKGROUND

Recreational vehicles, such as a golf cart for example, often lack means for providing adequate ventilation or fresh air for the occupants in the "cab". The vehicles, in general, include a windshield which diverts air flow around the cab with minimal to no air flowing into the occupied cab. Consequently, the space within the cab often gets hot, particularly when the sun heats up the roof of the vehicle.

Accordingly, there exists a need for a vent that can be mounted on the roof of a vehicle and be operable to adjust the opening for controlling the flow of outside air into the occupied area of the "cab".

SUMMARY

A non-limiting exemplary embodiment of a vent includes a damper, a clamp, and a connector. The damper is defined at least in part an elongated middle panel, first and second panels extending in opposite directions from the middle panel, first and second walls along outer edges of respective first and second panels, and first and second ledges extending from an edge of respective first and second walls. The middle panel includes opposing first and second ends, and integrated first and second detents at respective first and second ends. The first and second walls extend away from respective first and second panels in opposite directions from each other. The clamp includes complementary first and second pads configured for being removably affixed to each other to define adjoining first and second sections, an opening in the first section configured for housing at least a portion of the first detent, and a recess along at least a portion of an outer edge of the second section. The connector includes adjoining first and second sections, wherein the first section includes an opening configured for removably receiving at least a portion of the second detent, and the second section comprises a recess along at least a portion of an outer edge thereof.

Another non-limiting exemplary embodiment of a vent includes a connector, a damper, and a clamp. The connector includes adjoining first and second sections, wherein the first section comprises an integrated detent, and the second section comprises a recess along at least a portion of an outer edge thereof. The damper is defined at least in part an elongated middle panel, first and second panels extending in opposite directions from the middle panel, first and second walls along outer edges of respective first and second panels, and first and second ledges extending from an edge of respective first and second walls. The middle panel includes opposing first and second ends, wherein the first end includes an integrated detent, and the second end includes an opening for receiving at least a portion of the detent of the connector. The first and second walls extend away from respective first and second panels in opposite directions from each other. The clamp includes complementary first and second pads configured for being removably affixed to each other to define adjoining first and second sections, an opening in the first section configured for housing at least a portion of the detent of the middle panel, and a recess along at least a portion of an outer edge of the second section.

DETAILED DESCRIPTION

One or more non-limiting embodiments are described herein with reference to the accompanying drawings, wherein like numerals designate like elements. It should be clearly understood that there is no intent, implied or otherwise, to limit the disclosure in any way, shape or form to the embodiments illustrated and described herein. While multiple exemplary embodiments are provided, variations thereof will become apparent or obvious to a person of ordinary skills. Accordingly, any and all variants for providing functionalities similar to those described herein are considered as being within the metes and bounds of the instant disclosure.

Figure 1:
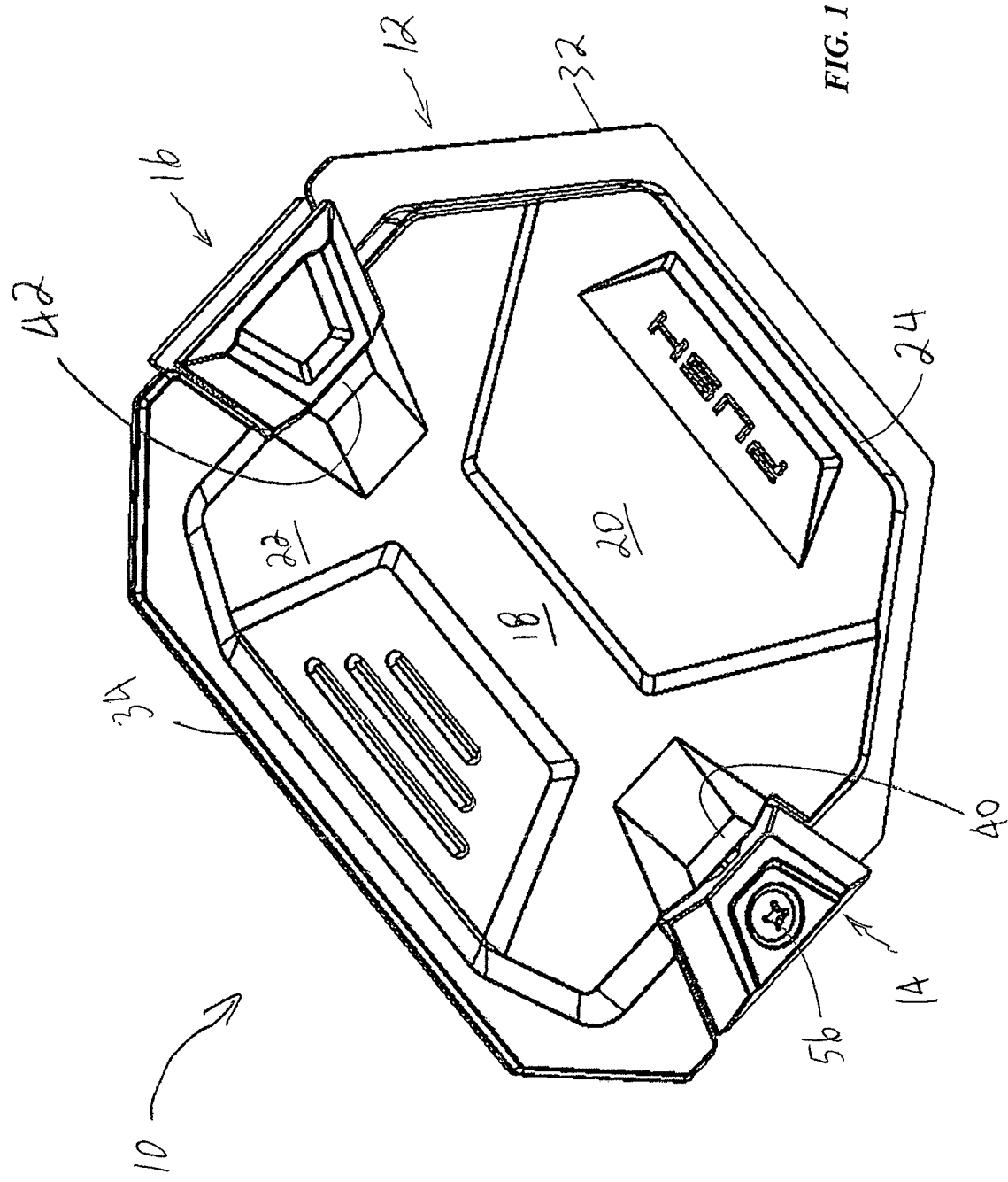
FIG. 1 is a perspective view of a non-limiting exemplary embodiment of a vent of the instant disclosure.
Figure 2:
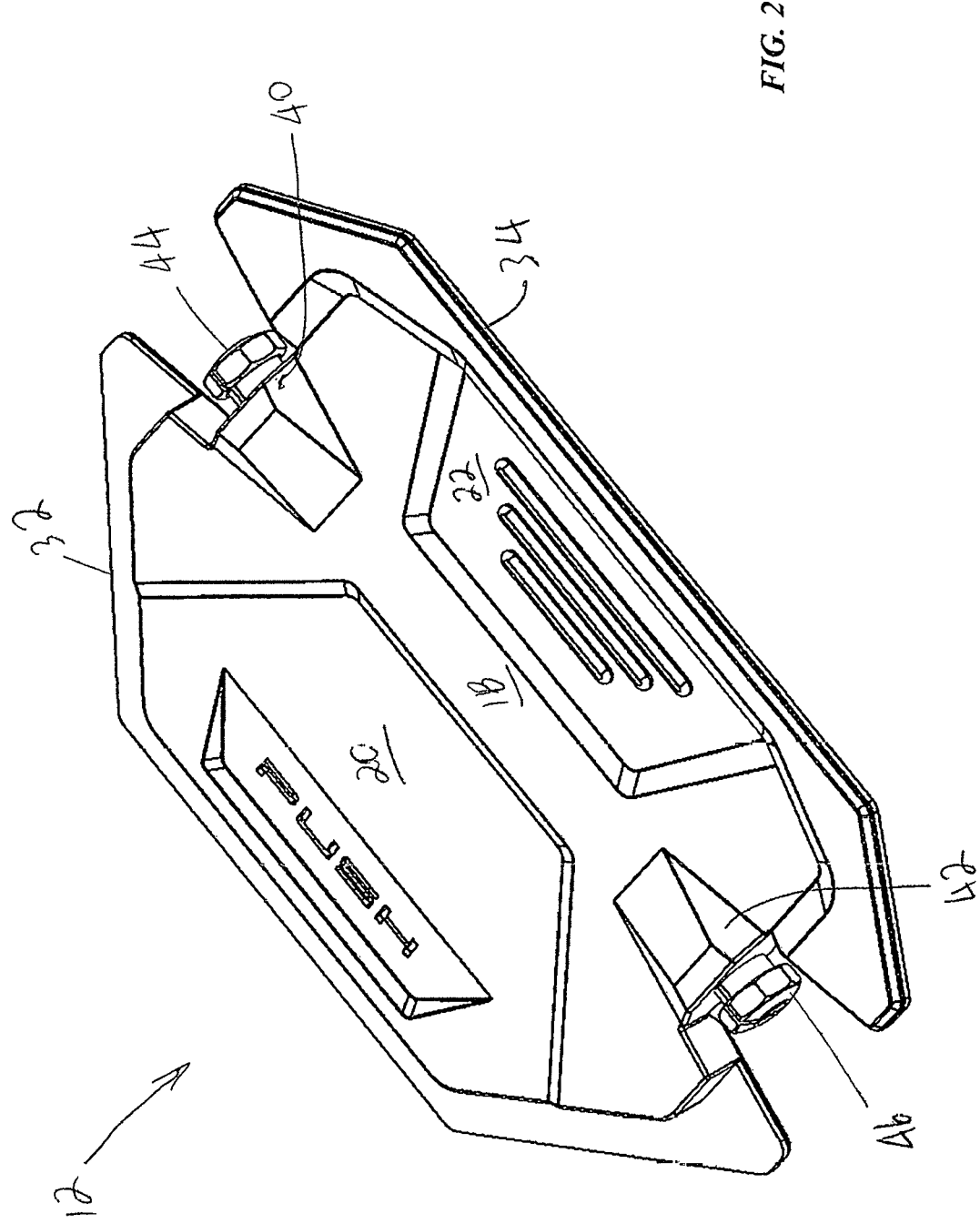
FIG. 2 is a perspective view of a non-limiting exemplary embodiment of a damper for the vent illustrated in FIG. 1.
Figure 3:
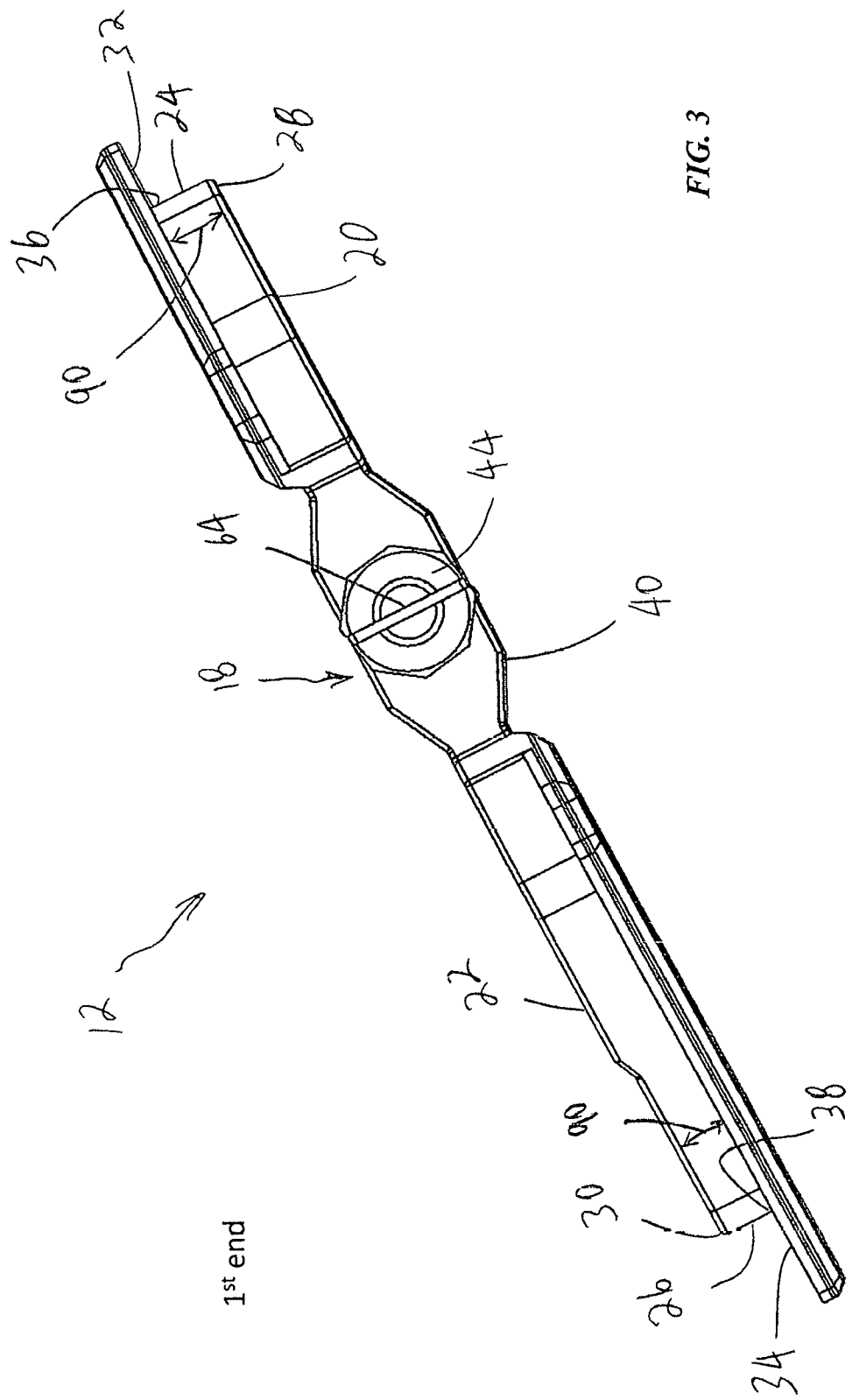
FIG. 3 is an end view of the damper illustrated in FIG. 2.
Figure 4:
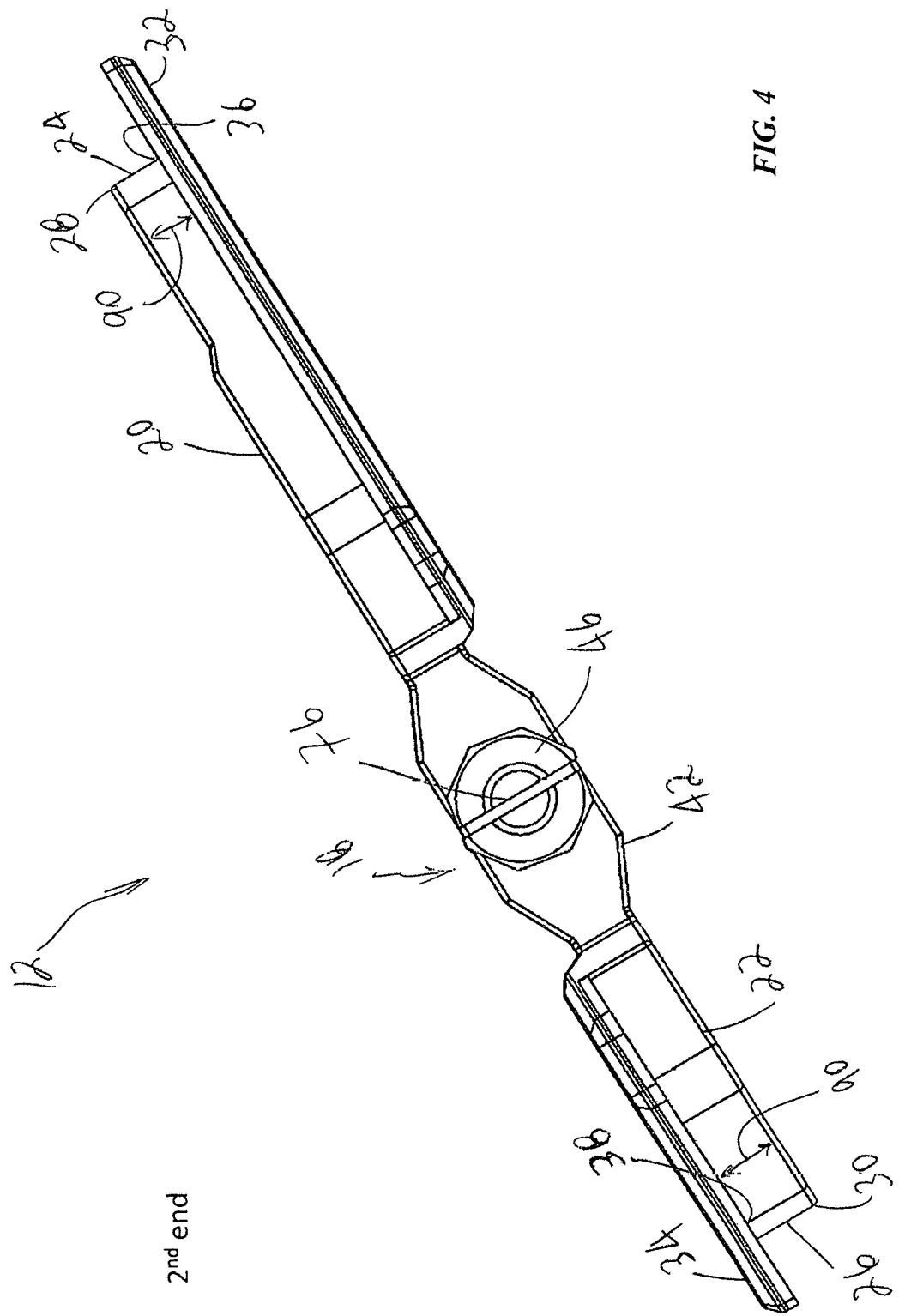
FIG. 4 is an end view of the damper illustrated in FIG. 2 opposite the end view illustrated in FIG. 3.
Figure 5:
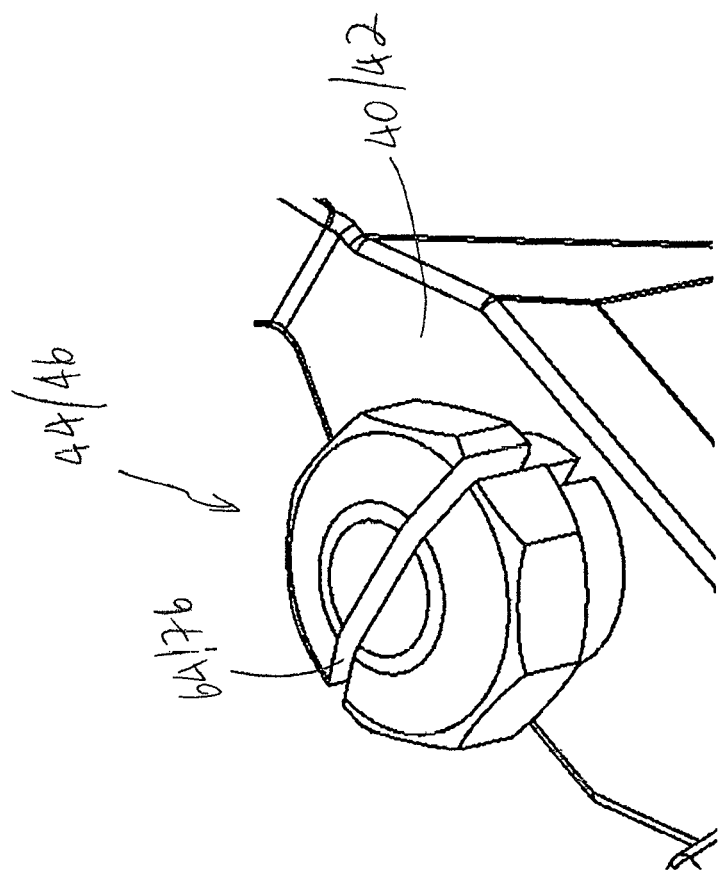
FIG. 5 is a perspective view of a detent of the damper illustrated in FIGS. 2-4.

FIG. 1 illustrates a non-limiting exemplary embodiment of a vent 10 of the instant disclosure. In some embodiments, the vent 10 includes a damper 12, a clamp 14, and a connector 16. In certain non-limiting exemplary embodiments, such as that illustrated in FIGS. 2-4, the damper 12 is defined at least in part by an elongated middle panel 18, first and second panels 20 and 22 extending in opposite directions from the middle panel 18, first and second walls 24, 26 along outer edges 28, 30 of respective first and second panels 20, 22, and first and second ledges 32, 34 extending from edges 36, 38 of respective first and second walls 24, 26. In some embodiments, the first and second walls 24, 26 extend away from respective first and second panels 20, 22 in opposite directions from each other. In certain embodiments, the middle panel 18 includes opposing first and second ends 40, 42 respectively having integrated detents 44, 46, such as that illustrated in FIG. 5.

Figure 6:
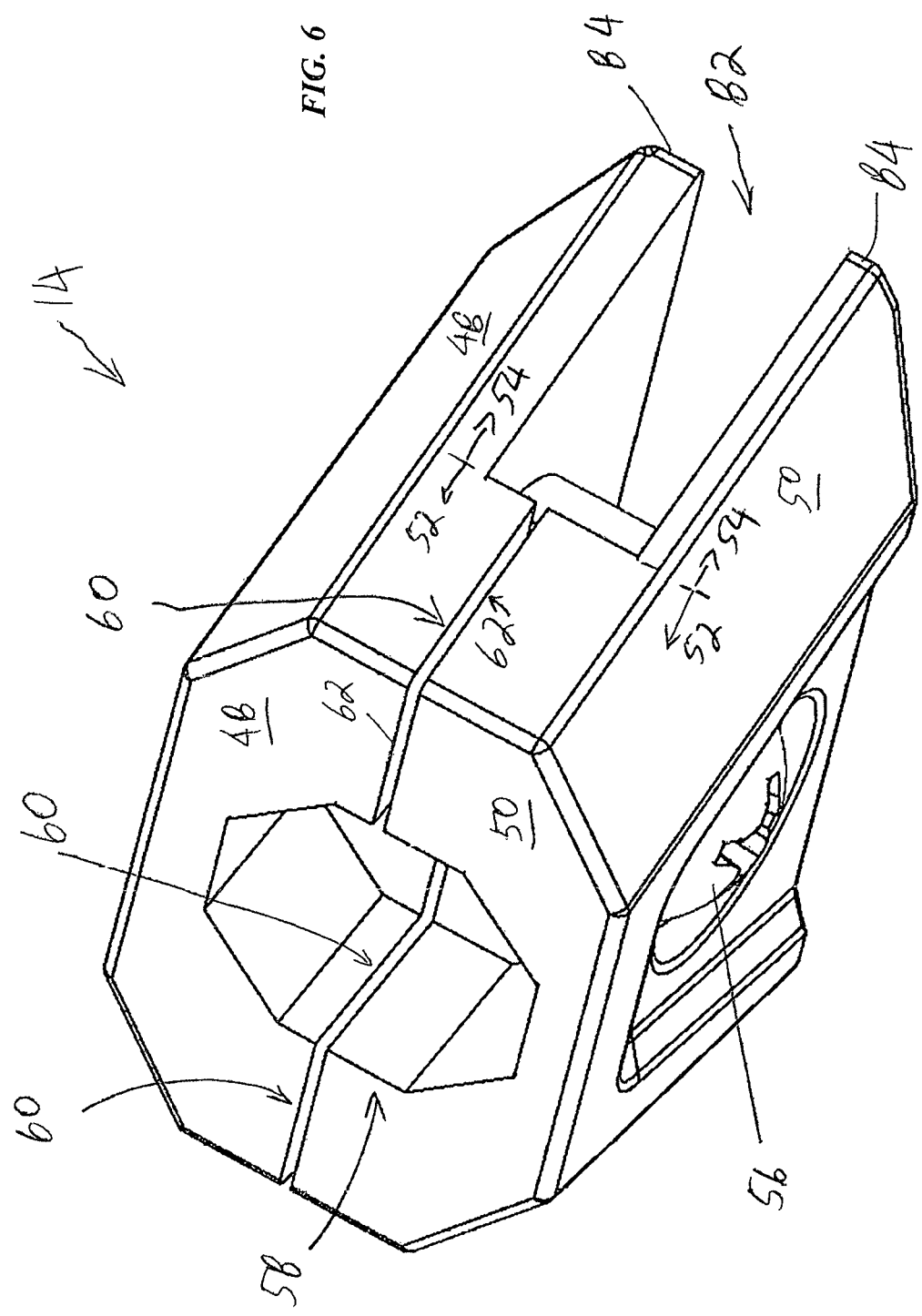
FIG. 6 is a perspective view of a non-limiting exemplary embodiment of a clamp for the vent illustrated in FIG. 1.
Figure 7:
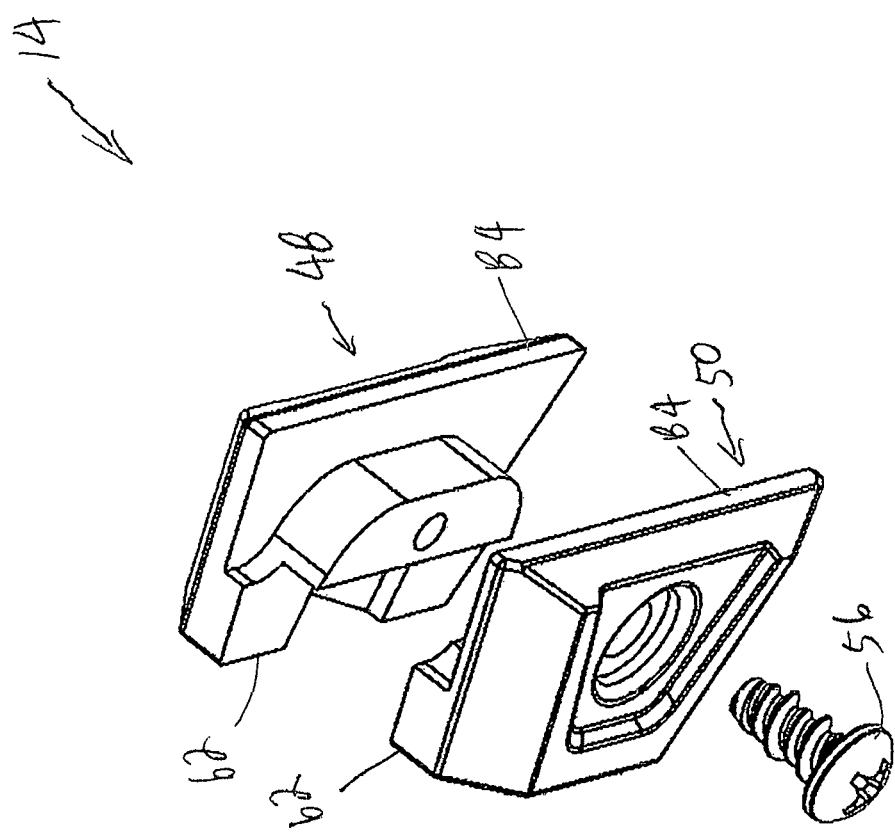
FIG. 7 is a perspective view of the clamp of FIG. 5 illustrated in a dis-assembled state.

In certain non-limiting exemplary embodiments, such as that illustrated in FIGS. 6 and 7, the clamp 14 includes complementary first and second pads 48, 50 configured for being removably affixed to each other, as illustrated in FIG. 6. When affixed to each other, the first and second pads 48, 50 define the clamp 14 having adjoining first and second sections 52, 54 of the clamp 14. In some embodiments, a fastener 56 is provided for removably affixing the first and second pads 48, 50 to each other.

In some embodiments, the clamp 14 includes an opening 58 in the first section 52 and a recess 60 along at least a portion of an outer edge 62 of the first section 52. In certain embodiments, the opening 58 is configured for housing at least a portion of the first detent 44. In some embodiments, the recess 60 extends through at least a portion of the opening 58. In certain embodiments, the recess 60 is configured for enabling at least a portion of the first section 52 to flex when the first detent 44 rotates within the opening 58. In some embodiments, the first detent 44 includes a recess 64. In certain embodiments, the recess 64 is configured for enabling at least a portion of the first detent 44 to flex when the first detent 44 rotates within the opening 58. It should be clearly understood that it is not a requirement that both the clamp 14 and the first detent 44 have respective recesses 60 and 64. In some embodiments, the clamp 14 includes the recess 60 whereas the first detent 44 does not have any recesses. In certain embodiments, the first detent 44 includes the recess 64 whereas the clamp 14 does not include the recess 60. In some embodiments, both the clamp 14 and the first detent 44 have respective recesses 60 and 64. In certain embodiments, the recess 64 traverses the entire longitudinal extent of the first detent 44. However, this must not be construed as a requirement. In some embodiments, the recess 64 traverses a portion of the first detent 44.

Figure 8:
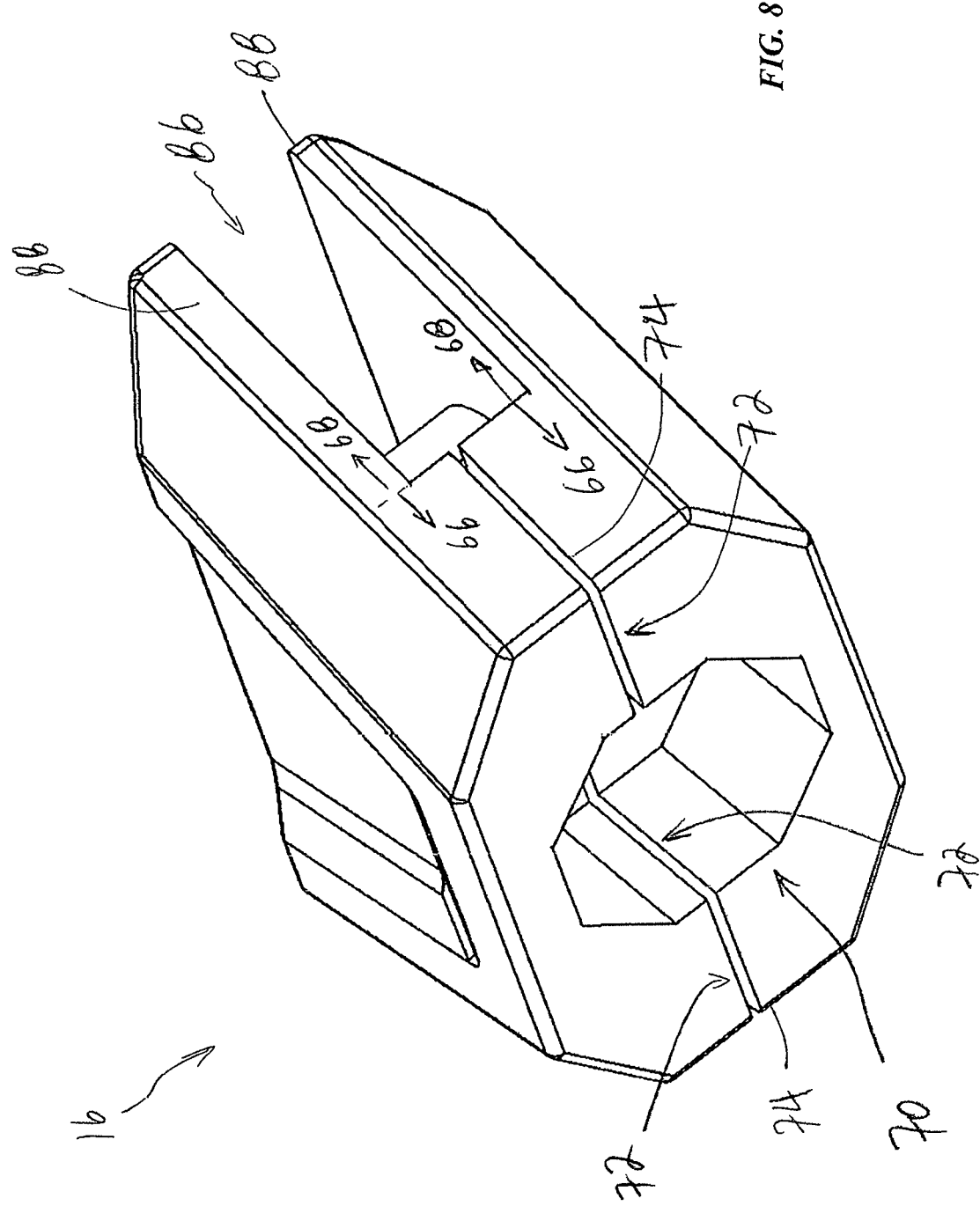
FIG. 8 is a perspective view of a non-limiting exemplary embodiment of a connector for the vent illustrated in FIG. 1.
Figure 9:
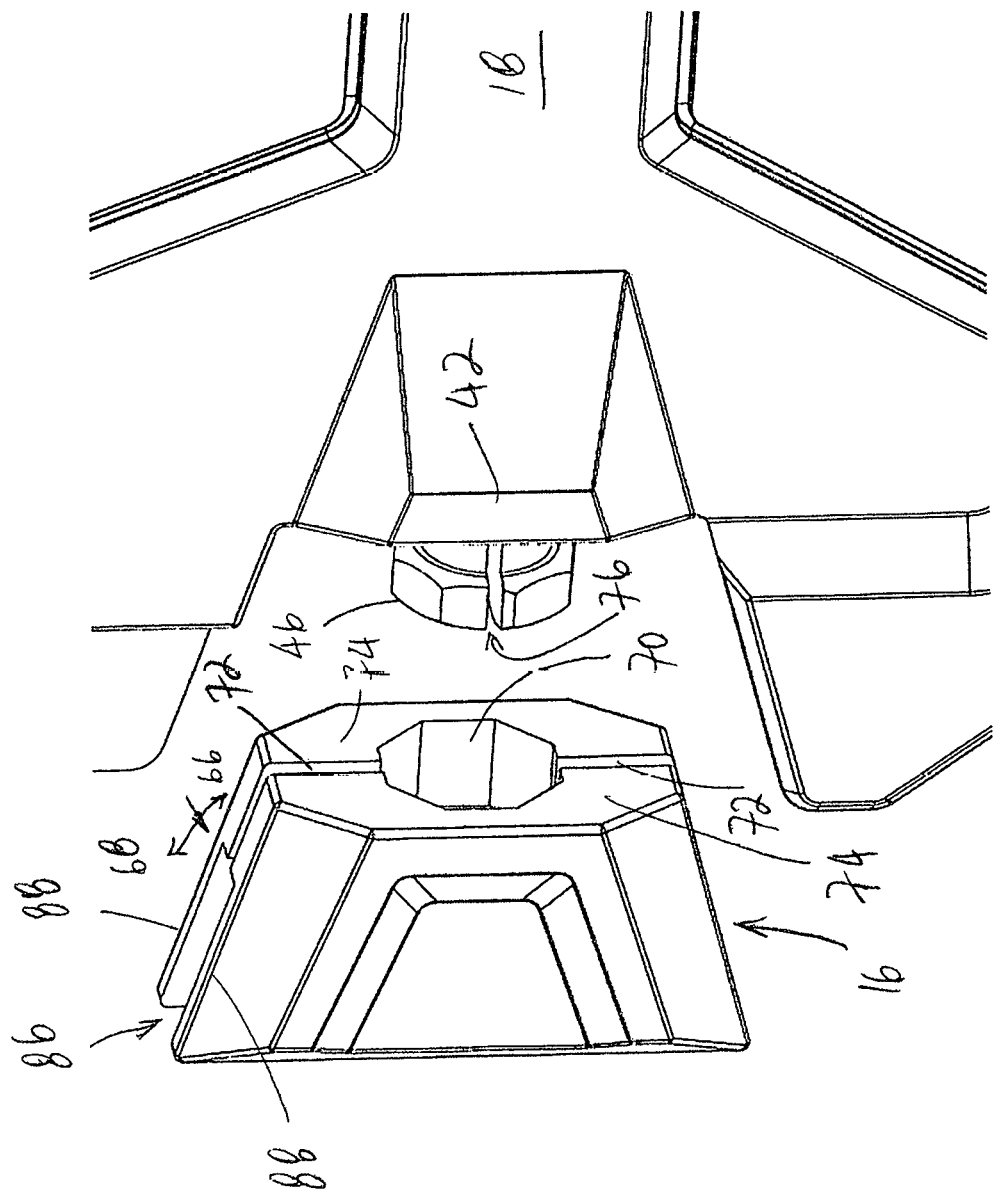
FIG. 9 is a close-up perspective view of the detent of FIG. 5 and the connector of FIG. 8 in close proximity of each other.

In certain non-limiting exemplary embodiments, such as that illustrated in FIG. 8, the connector 16 includes adjoining first and second sections 66 and 68. In some embodiments, the first section 66 includes an opening 70 and a recess 72 along at least a portion of an outer edge 74 of the first section 66. In certain embodiments, such as that illustrated in FIG. 9, the opening 70 is configured for receiving at least a portion of the second detent 46. In some embodiments, the recess 72 extends through at least a portion of the opening 70. In certain embodiments, the recess 72 is configured for enabling at least a portion of the first section 66 to flex when the second detent 46 rotates within the opening 70. In some embodiments, the second detent 46 includes a recess 76. In certain embodiments, the recess 76 is configured for enabling at least a portion of the second detent 46 to flex when the second detent 46 rotates within the opening 70. It should be clearly understood that it is not a requirement that both the connector 16 and the second detent 46 have respective recesses 72 and 76. In some embodiments, the connector 16 includes the recess 72 whereas the second detent 46 does not have any recesses. In certain embodiments, the second detent 46 includes the recess 76 whereas the connector 16 does not include the recess 72. In some embodiments, both the connector 16 and the second detent 46 have respective recesses 72 and 76. In certain embodiments, the recess 76 traverses the entire longitudinal extent of the second detent 46. However, this must not be construed as a requirement. In some embodiments, the recess 76 traverses a portion of the second detent 46.

In some non-limiting exemplary embodiments, the connector 16 is a single piece of unitary structure or construction. However, the unitary structure should not be construed as being limiting or a requirement. As will be apparent to one skilled in the art, in certain non-limiting exemplary embodiments, the connector 16 can be a two-piece component similar to the clamp 14. Accordingly, some embodiments of the connector 16 have complementary first and second pads similar to the complementary first and second pads 48, 50 of the clamp 14.

Figure 10:
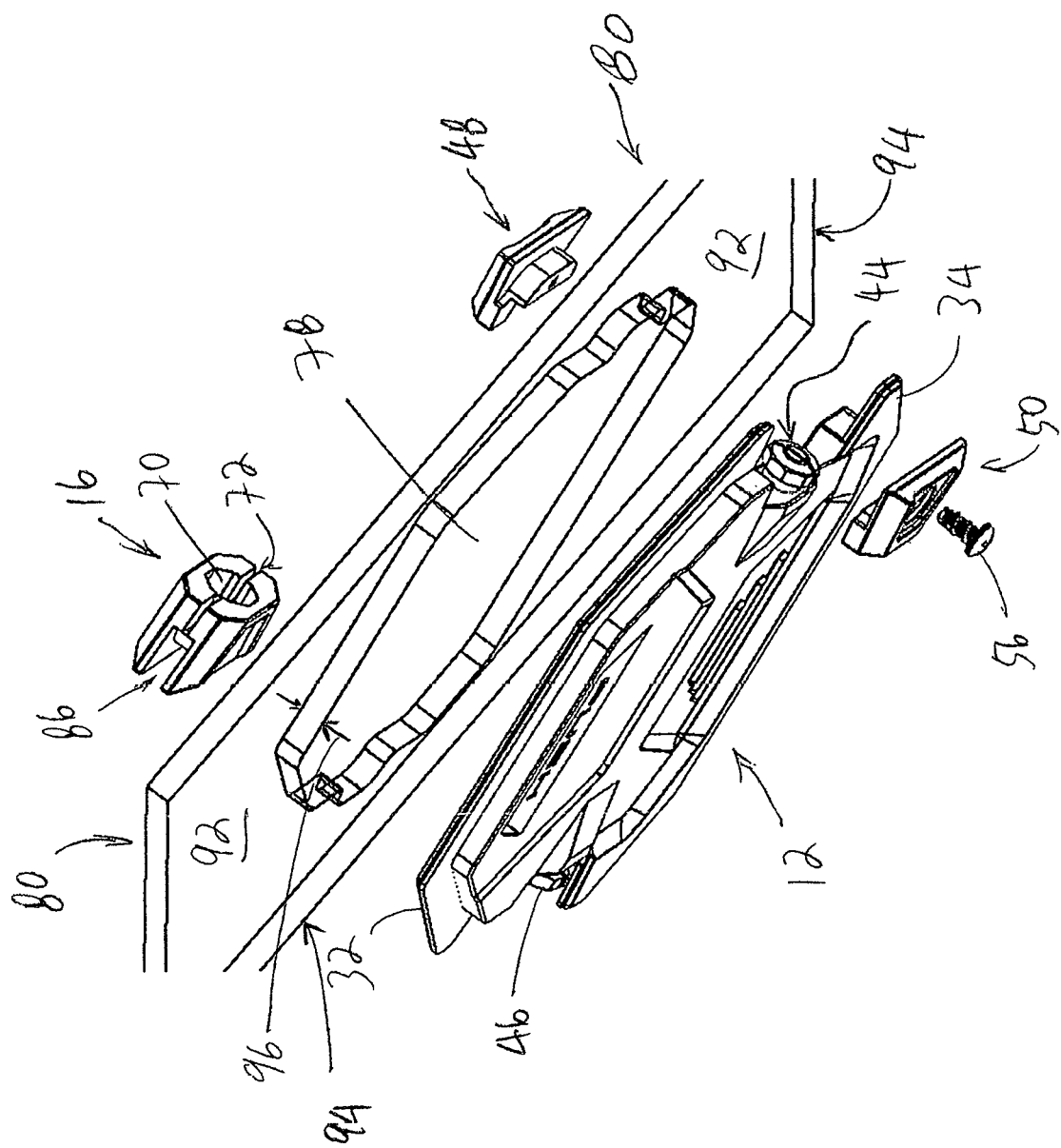
FIG. 10 is a perspective view of the vent of FIG. 1 in close proximity of an opening in a substantially planar structure to which the vent can be mounted.
Figure 11:
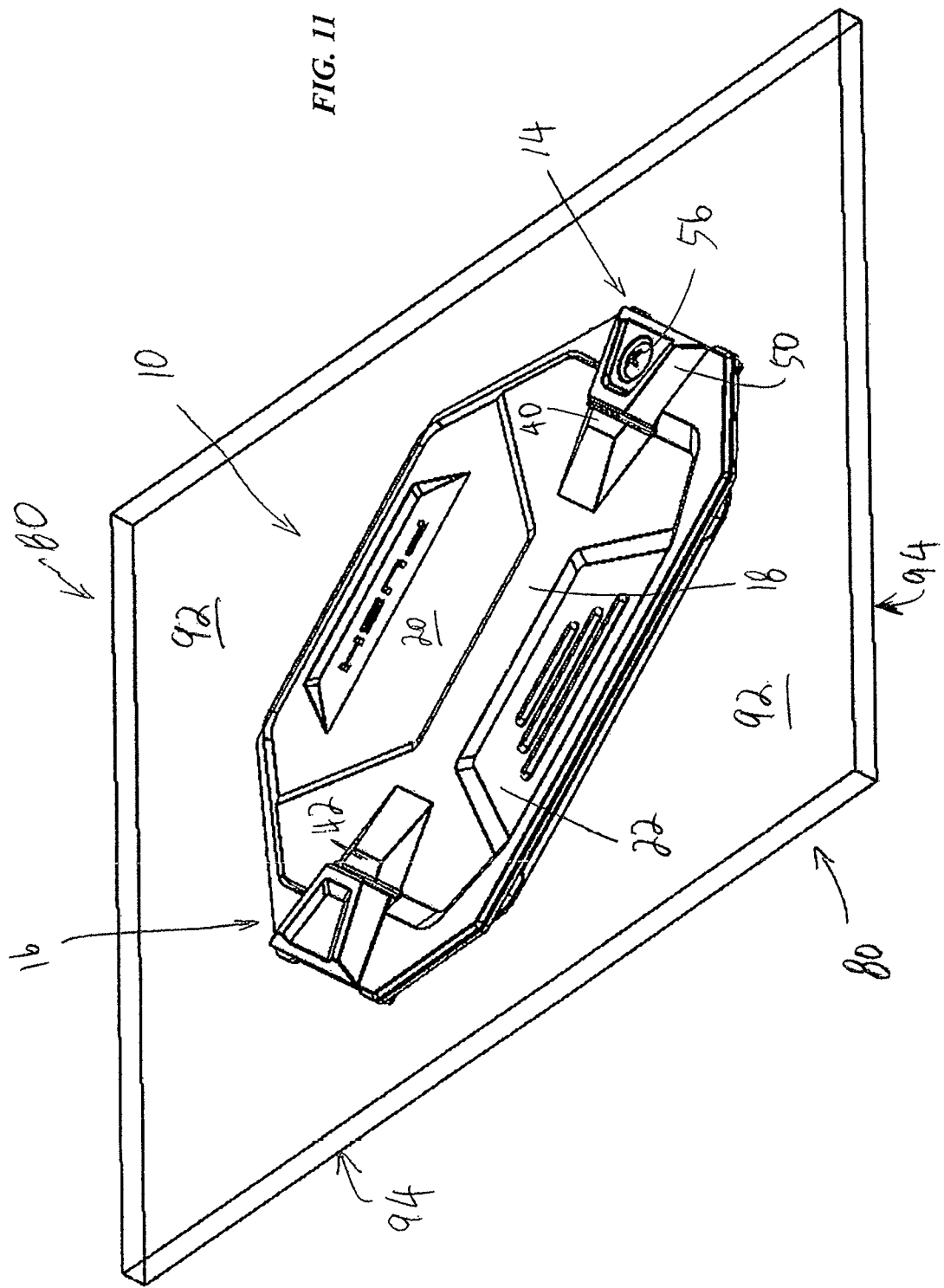
FIG. 11 is a perspective view of the vent of FIG. 1 mounted on a substantially planar structure in a closed position.
Figure 12:
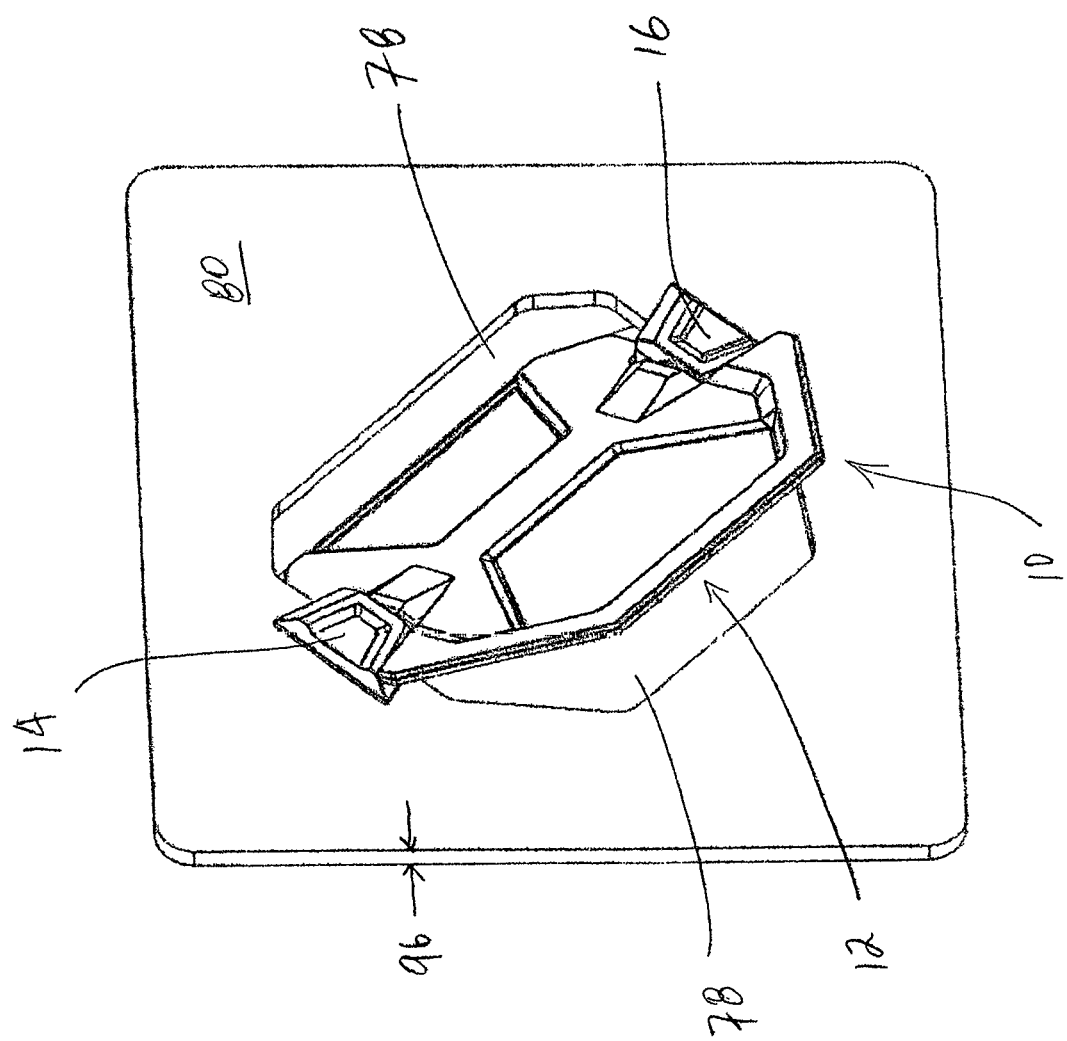
FIG. 12 is a perspective view of the vent of FIG. 11 in a partially open position.

FIG. 10 illustrates the vent 10 and its individual components proximate an opening 78 in a substantially planar structure 80 on which at least a portion of the vent 10 can be installed or mounted. FIGS. 11 and 12 illustrate the vent 10 mounted on at least a portion of the planar structure 78. FIGS. 11 and 12, respectively, illustrate the vent 10 in a closed position and in a partially open position. Accordingly, in certain non-limiting exemplary embodiments, the clamp 14 includes a recess 82 along an outer edge 84 of the second section 54, and the connector 16 includes a recess 86 along an outer edge 88 of the second section 68. In some embodiments, the recesses 82, 86 are configured for receiving at least a portion of the planar structure 78 to which they can be snugly and removably affixed. In certain embodiments, the fastener 56 provided for removably affixing the first and second pads 48, 50 to each other extends through the planar structure 78.

In certain non-limiting exemplary embodiments, the first detent 44 and the corresponding opening 58 in the clamp 14 have complimentary contours; and the second detent 46 and the corresponding opening 70 in the connector 16 have complimentary contours. It should be well understood that it is not a requirement that both the first detent 44 and the opening 58 and the second detent 46 and the opening 68 have complementary contours. In certain embodiments, only the first detent 44 and the corresponding opening 58 have complementary contours. In some embodiments, only the second detent 46 and the corresponding opening 70 have complementary contours.

In certain embodiments, the first detent 44 and the corresponding opening 58 are configured for adjustably retaining the vent 10 in one of a plurality of positions relative to the planar structure 78. In some embodiments, the second detent 46 and the corresponding opening 70 are configured for adjustably retaining the vent 10 in one of a plurality of positions relative to the planar structure 78. In certain embodiments, both the first and second detents 44, 46 and the corresponding openings 58, 70 are configured for adjustably retaining the vent 10 in one of a plurality of positions relative to the planar structure 78. In a non-limiting exemplary embodiment, the first detent 44 and/or the second detent 46 are multi-faceted.

In a non-limiting exemplary embodiment, a height 90 of the first and second walls 24, 26 is substantially equal. In certain non-limiting exemplary embodiments, the planar structure 78 is defined at least in part by spaced-apart first and second surfaces 92, 94, and a thickness 96. In some non-limiting exemplary embodiments, the thick 96 of the planar structure 78 is substantially equal to the height 90 of the first and second walls 24, 26. In a non-limiting exemplary embodiment, the first ledge 32 abuts the first surface 92 and the second ledge 34 abuts the second surface 94 when the vent 10 and the planar structure 78 are aligned, i.e., when the vent 10 is "closed".

From the foregoing, it will be apparent to one skilled in the art, that in one or more non-limiting exemplary embodiments, the clamp 14 and the connector 16, respectively, can be configured with detents similar to first and second detents 44, 46 instead of, and at the same respective locations as, the openings 58, 70. In one or more such non-limiting exemplary embodiments, the first and second ends 40, 42 of the elongated middle panel 18 would include openings similar to the openings 58, 70, respectively, instead of the first and second detents 44, 46. It will be further apparent to one skilled in the art that the clamp 14 and the connector 16, both, do not have to be configured with detents similar to first and second detents 44, 46 with corresponding openings similar to the openings 58, 70 at the first and second ends 40, 42 of the elongated middle panel 18.

Accordingly, in a non-limiting exemplary embodiment, while the first end 40 of the middle panel 18 includes the first detent 44 and the first section 52 of the clamp 14 includes the opening 58, the second end 42 of the middle panel includes an opening similar to the opening 70 and the first section 66 of the connector 16 includes a detent similar to the second detent 46.

In view thereof, modified and/or alternate configurations of the embodiments described herein may become apparent or obvious to one of ordinary skill. All such variations are considered as being within the metes and bounds of the instant disclosure. For instance, while reference may have been made to particular feature(s) and/or function(s), the disclosure is considered to also include embodiments configured for functioning and/or providing functionalities similar to those disclosed herein with reference to the accompanying drawings. Accordingly, the spirit, scope and intent of the instant disclosure is to embrace all such variations. Consequently, the metes and bounds of the disclosure is solely defined by the appended claims and any and all equivalents thereof.

What is claimed is:

1. A vent, comprising:
    a damper defined at least in part by:
        an elongated middle panel comprising:
            opposing first and second ends; and
            integrated first and second detents at respective first and second ends thereof;
        first and second panels extending in opposite directions from the middle panel;
        first and second walls along outer edges of respective first and second panels, the first and second walls extending away from respective first and second panels in opposite directions from each other; and
        first and second ledges extending from an edge of respective first and second walls;
    a clamp comprising complementary first and second pads configured for being removably affixed to each other to define:
        adjoining first and second sections;
        an opening in the first section of the clamp configured for housing at least a portion of the first detent; and
        a recess along at least a portion of an outer edge of the second section of the clamp; and
    a connector comprising adjoining first and second sections, wherein
        the first section of the connector comprises an opening configured for removably receiving at least a portion of the second detent; and
        the second section of the connector comprises a recess along at least a portion of an outer edge thereof.

2. The vent of claim 1, wherein the recesses along the outer edges of the second sections of the clamp and of the connector are configured for removably retaining at least a portion of a substantially planar structure on which the vent is mounted.

3. The vent of claim 2, comprising
    a recess along at least a portion of an outer edge of the first section of the clamp and extending through at least a portion of the opening, the recess configured for enabling at least a portion of the first section to flex when the first detent rotates within the opening; and
    a recess along at least a portion of an outer edge of the first section of the connector and extending through at least a portion of the opening, the recess configured for enabling at least a portion of the first section to flex when the second detent rotates within the opening.

4. The vent of claim 3, wherein
    the first detent and the opening in the clamp have complimentary contours; and
    the second detent and the opening in the connector have complimentary contours.

5. The vent of claim 4, wherein at least one of the first and second detent and the corresponding opening in the clamp and in the connector is configured for adjustably retaining the vent in one of a plurality of positions relative to the substantially planar structure.

6. The vent of claim 5, wherein at least one of the detents is multi-faceted.

7. The vent of claim 5, wherein
    a height of the first and second walls is substantially equal;
    the substantially planar structure is defined at least in part by spaced-apart first and second surfaces; and
    a thickness of the planar structure is substantially equal to the height of the first and second walls.

8. The vent of claim 7, wherein the first ledge abuts the first surface and the second ledge abuts the second surface when the vent and the planar structure are aligned.

9. The vent of claim 2, comprising a fastener for removably affixing the first and second pads of the clamp to each other.

10. The vent of claim 9, wherein the fastener extends through the substantially planar structure.

11. The vent of claim 1, wherein
    the first detent comprises a recess extending through at least a portion thereof, the recess configured for enabling at least a portion of the first detent to flex when rotated within the opening of the clamp; and
    the second detent comprises a recess extending through at least a portion thereof, the recess configured for enabling at least a portion of the second detent to flex when rotated within the opening of the connector.

12. The vent of claim 1, wherein the connector comprises complementary first and second pads that are substantially similar to the first and second pads of the clamp.

13. A vent, comprising:
    a connector comprising adjoining first and second sections, wherein
        the first section of the connector of comprises an integrated detent; and
        the second section of the connector comprises a recess along at least a portion of an outer edge thereof;
    a damper defined at least in part by:
        an elongated middle panel comprising:
            opposing first and second ends;
            an integrated detent at the first end thereof; and an opening in the second end thereof configured for removably receiving the detent of the connector;

first and second panels extending in opposite directions from the middle panel;

first and second walls along an outer edge of respective first and second panels, the first and second walls extending away from respective first and second panels in opposite directions from each other; and first and second ledges extending from an edge of respective first and second walls;

a clamp comprising complementary first and second pads configured for being removably affixed to each other to define:

adjoining first and second sections;

an opening in the first section of the clamp configured for housing the detent of the middle panel;

a recess along at least a portion of an outer edge of the second section of the clamp.

14. The vent of claim 13, wherein the recesses along the outer edges of the second sections of the connector and of the clamp are configured for removably retaining at least a portion of a substantially planar structure on which the vent is mounted.

15. The vent of claim 14, comprising a recess along at least a portion of an outer edge of the first section of the clamp and extending through at least a portion of the opening, the recess configured for enabling at least a portion of the first section to flex when the detent of the middle panel rotates within the opening.

16. The vent of claim 15, wherein
the detent of the middle panel and the opening in the clamp have complimentary contours; and
the detent of the connector and the opening in the second end of the middle panel have complimentary contours.

17. The vent of claim 16, wherein at least one of the detent of the middle panel and the detent of the connector and the corresponding opening in the clamp and in the connector is configured for adjustably retaining the vent in one of a plurality of positions relative to the substantially planar structure.

18. The vent of claim 17, wherein at least one of the detents is multi-faceted.

19. The vent of claim 17, wherein
a height of the first and second walls is substantially equal;
the substantially planar structure is defined at least in part by spaced-apart first and second surfaces; and
a distance between the spaced-apart first and second surfaces is substantially equal to the height of the first and second walls.

20. The vent of claim 19, wherein the first ledge abuts the first surface and the second ledge abuts the second surface when the vent and the planar structure are aligned.

21. The vent of claim 14, comprising a fastener for removably affixing the first and second pads of the clamp to each other.

22. The vent of claim 21, wherein the fastener extends through the substantially planar structure.

23. The vent of claim 13, wherein
the detent of the middle panel comprises a recess extending through at least a portion thereof, the recess configured for enabling at least a portion of the detent to flex when rotated within the opening of the clamp; and
the detent of the connector comprises a recess extending through at least a portion thereof, the recess configured for enabling at least a portion of the detent to flex when rotated within the opening of the connector.

24. The vent of claim 13, comprising a recess along at least a portion of an outer edge of the second end of the middle panel and extending through at least a portion of the opening, the recess configured for enabling at least a portion thereof to flex when the detent of the connector rotates within the opening.

25. The vent of claim 13, wherein the connector comprises complementary first and second pads configured for being removably affixed to each other to define:
the adjoining first and second sections;
the detent; and
the recess of the second section.

* * * * *